United States Patent
Chiga et al.

(10) Patent No.: US 10,903,523 B2
(45) Date of Patent: Jan. 26, 2021

(54) NONAQUEOUS ELECTROLYTE AND NONAQUEOUS ELECTROLYTE SECONDARY BATTERY

(71) Applicant: Panasonic Corporation, Kadoma (JP)

(72) Inventors: Takanobu Chiga, Osaka (JP); Naoya Morisawa, Hyogo (JP); Kazuhiro Iida, Tokyo (JP); Atsushi Fukui, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 125 days.

(21) Appl. No.: 16/360,508

(22) Filed: Mar. 21, 2019

(65) Prior Publication Data

US 2019/0221889 A1  Jul. 18, 2019

Related U.S. Application Data

(63) Continuation of application No. PCT/JP2017/018950, filed on May 22, 2017.

(30) Foreign Application Priority Data

Sep. 30, 2016 (JP) .................................. 2016-194972

(51) Int. Cl.
*H01M 4/525* (2010.01)
*H01M 10/0525* (2010.01)
(Continued)

(52) U.S. Cl.
CPC ....... *H01M 10/0569* (2013.01); *H01M 4/525* (2013.01); *H01M 10/0525* (2013.01);
(Continued)

(58) Field of Classification Search
CPC ........... H01M 4/525; H01M 2004/028; H01M 10/0525; H01M 10/0567; H01M 10/0568;
(Continued)

(56) References Cited

U.S. PATENT DOCUMENTS

2010/0081062 A1 4/2010 Chiga et al.
2010/0266904 A1 10/2010 Jeon et al.
(Continued)

FOREIGN PATENT DOCUMENTS

JP  2003-282138 A  10/2003
JP  2009-289414 A  12/2009
(Continued)

OTHER PUBLICATIONS

International Search Report dated Aug. 8, 2017, issued in counterpart International Application No. PCT/JP2017/018950 (2 pages).

*Primary Examiner* — Brittany L Raymond
(74) *Attorney, Agent, or Firm* — Westerman, Hattori, Daniels & Adrian, LLP

(57) ABSTRACT

A nonaqueous electrolyte includes a lithium salt, a trifluoropropionate ester of the formula (1), and a fluorinated carboxylate ester of the formula (2). The amount of (1) is not less than 10 mass % of the nonaqueous electrolyte. In the formulae, R1 is a $C_{1-3}$ alkyl group, one or two of X1 to X4 are fluorine atoms, R2 is a hydrogen atom, a $C_{1-3}$ alkyl group or a fluorinated $C_{1-3}$ alkyl group, and R3 is a $C_{1-3}$ alkyl group or a fluorinated $C_{1-3}$ alkyl group.

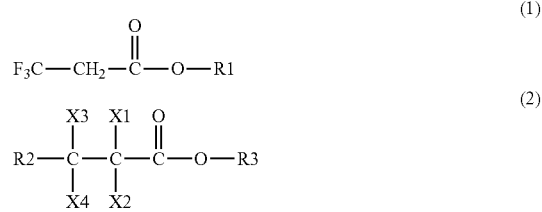

11 Claims, 1 Drawing Sheet

(51) Int. Cl.
- *H01M 10/0567* (2010.01)
- *H01M 10/0568* (2010.01)
- *H01M 10/0569* (2010.01)
- *H01M 4/02* (2006.01)

(52) U.S. Cl.
CPC ... *H01M 10/0567* (2013.01); *H01M 10/0568* (2013.01); *H01M 2004/028* (2013.01); *H01M 2300/004* (2013.01)

(58) Field of Classification Search
CPC ..... H01M 10/0569; H01M 2300/0034; H01M 2300/0037; H01M 2300/004; Y02E 60/10
See application file for complete search history.

(56) References Cited

U.S. PATENT DOCUMENTS

| | | |
|---|---|---|
| 2014/0302401 A1 | 10/2014 | Burkhard et al. |
| 2014/0302402 A1 | 10/2014 | Chen et al. |

FOREIGN PATENT DOCUMENTS

| | | |
|---|---|---|
| JP | 2010-86914 A | 4/2010 |
| JP | 2010-539640 A | 12/2010 |
| JP | 5235437 B2 | 7/2013 |
| JP | 2016-519400 A | 6/2016 |
| WO | 2008/102493 A1 | 8/2008 |
| WO | 2013/008439 A1 | 1/2013 |

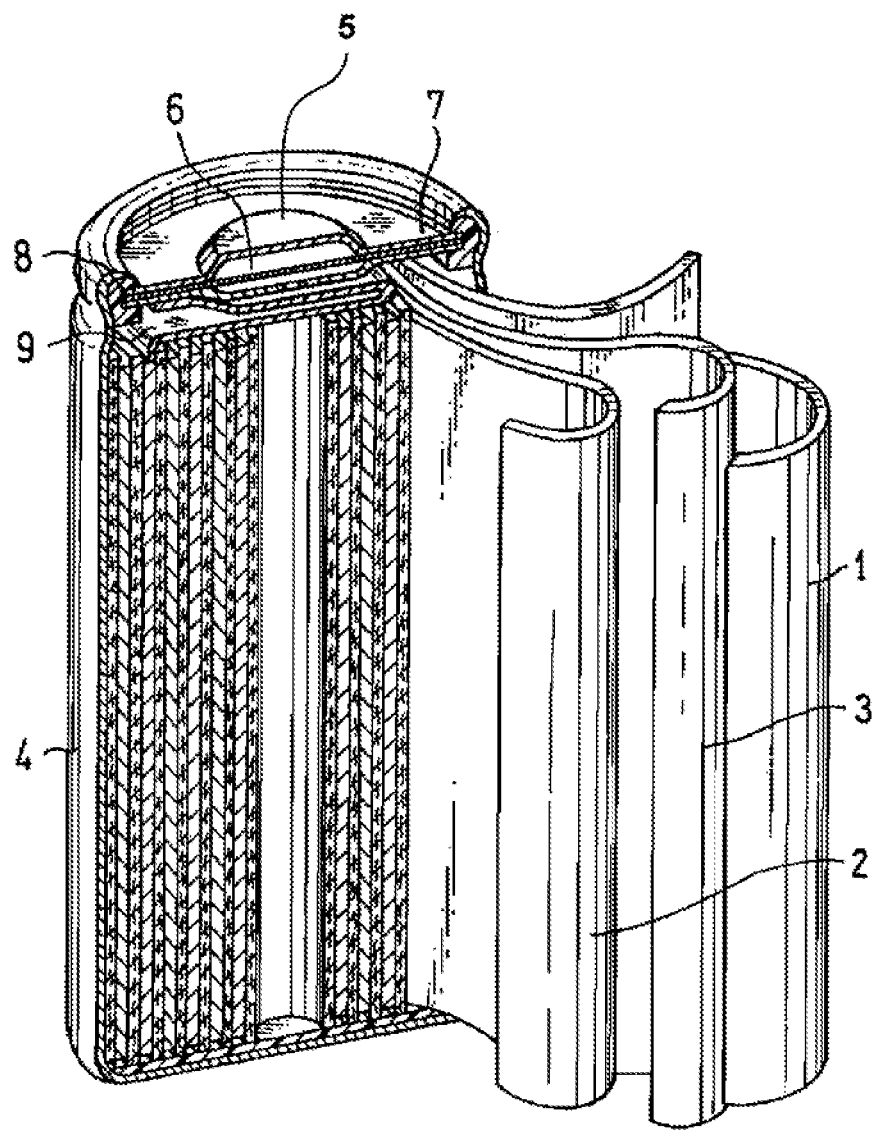

NONAQUEOUS ELECTROLYTE AND NONAQUEOUS ELECTROLYTE SECONDARY BATTERY

TECHNICAL FIELD

The present invention relates to a nonaqueous electrolyte used in secondary batteries, and to a nonaqueous electrolyte secondary battery including the nonaqueous electrolyte.

BACKGROUND ART

To increase the capacity of nonaqueous electrolyte secondary batteries such as lithium ion secondary batteries, studies have been conducted on the use of compounds (for example, oxides) containing transition metals such as nickel, cobalt and manganese as positive electrode active materials. In batteries using such positive electrode active materials, the positive electrode potential during charging is so high that good oxidation resistance of nonaqueous electrolytes is required.

Patent Literature 1 teaches that oxidation resistance is enhanced by introducing fluorine into solvent molecular structures. In order to suppress the reaction of the nonaqueous electrolyte with the negative electrode, Patent Literature 1 proposes that methyl 3,3,3-trifluoropropionate (FMP) be added to the nonaqueous electrolyte.

Further, Patent Literature 2 teaches that 0.01 to 5 mass % saturated fluorinated carboxylate ester be added in order to suppress the decomposition of the electrolytic solution on the negative electrode surface.

CITATION LIST

Patent Literature

PTL 1: Japanese Published Unexamined Patent Application No. 2009-289414
PTL 2: Japanese Published Unexamined Patent Application No. 2003-282138

SUMMARY

Although FMP has excellent oxidation resistance, the alkali resistance thereof is poor. In nonaqueous electrolyte secondary batteries, alkali components such as lithium hydroxide remain in the positive electrode active material. If the positive electrode active material particles are swollen and broken during initial charging, the nonaqueous electrolyte penetrates into the inside of the particles, and FMP loses HF by the action of the alkali components remaining inside the particles, thus forming the difluoroacrylate monomer. As a result, the initial efficiency is lowered and the reaction resistance is increased.

An aspect of the present disclosure resides in a nonaqueous electrolyte for secondary batteries including a lithium salt, a trifluoropropionate ester represented by the following formula (1):

[Chem. 1]

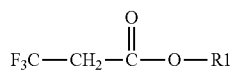

(1)

wherein R1 is a $C_{1-3}$ alkyl group, and a fluorinated carboxylate ester represented by the following formula (2):

[Chem. 2]

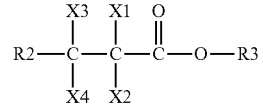

(2)

wherein X1, X2, X3 and X4 are each a hydrogen atom or a fluorine atom, one or two of X1 to X4 are fluorine atoms, R2 is a hydrogen atom, a $C_{1-3}$ alkyl group or a fluorinated $C_{1-3}$ alkyl group, and R3 is a $C_{1-3}$ alkyl group or a fluorinated $C_{1-3}$ alkyl group, the amount of the trifluoropropionate ester being not less than 10 mass % of the nonaqueous electrolyte.

Another aspect of the present disclosure resides in a nonaqueous electrolyte secondary battery including a positive electrode, a negative electrode, a separator disposed between the positive electrode and the negative electrode, and the above nonaqueous electrolyte.

The nonaqueous electrolyte of the present disclosure allows a nonaqueous electrolyte secondary battery to attain high initial efficiency and small reaction resistance.

BRIEF DESCRIPTION OF DRAWINGS

FIG. 1 is a vertical sectional view schematically illustrating a nonaqueous electrolyte secondary battery according to an embodiment of the present invention.

DESCRIPTION OF EMBODIMENTS

[Nonaqueous Electrolytes]

A nonaqueous electrolyte for secondary batteries according to an embodiment of the present invention includes a lithium salt, a trifluoropropionate ester represented by the following formula (1):

[Chem. 3]

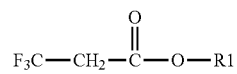

(1)

wherein R1 is a $C_{1-3}$ alkyl group, and a fluorinated carboxylate ester represented by the following formula (2):

[Chem. 4]

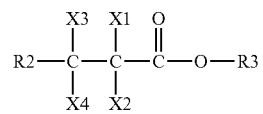

(2)

wherein X1, X2, X3 and X4 are each a hydrogen atom or a fluorine atom, one or two of X1 to X4 are fluorine atoms, R2 is a hydrogen atom, a $C_{1-3}$ alkyl group or a fluorinated $C_{1-3}$ alkyl group, and R3 is a alkyl group or a fluorinated $C_{1-3}$ alkyl group. The trifluoropropionate ester represents not less than 10 mass % of the nonaqueous electrolyte.

The trifluorocarboxylate ester represented by the formula (1) (hereinafter, also written as the trifluorocarboxylate ester (1)), for example, FMP, is excellent in oxidation resistance but is poor in alkali resistance. In a nonaqueous electrolyte secondary battery, positive electrode active material particles are swollen and broken during initial charging, and a nonaqueous electrolyte penetrates into the inside of the particles. When the nonaqueous electrolyte includes the trifluorocarboxylate ester (1), the trifluorocarboxylate ester (1) is continuously decomposed by the action of alkali components remaining inside the positive electrode active material particles, and consequently initial efficiency is decreased. The decomposition of the trifluorocarboxylate ester (1) generates a large amount of HF that causes the dissolution of the positive electrode metal. Further, HF reacts with alkali components to form water, which causes the decomposition of the solute (such as a lithium salt) contained in the nonaqueous electrolyte. Consequently, reaction resistance is increased. These problems tend to be more marked when the amount of the trifluoropropionate ester (1) is 10 mass % or more of the nonaqueous electrolyte.

In the present embodiment, the trifluorocarboxylate ester (1) is combined with a fluorinated carboxylate ester represented by the formula (2) (hereinafter, also written as the fluorinated carboxylate ester (2)). The fluorinated carboxylate ester (2) has one or two fluorine atoms on an α-position and/or a β-position relative to the carbonyl group. Similarly to the trifluorocarboxylate ester (1), this fluorinated carboxylate ester loses HF by the action of alkali components and is decomposed into the acrylate monomer and/or the monofluoroacrylate monomer. These monomers, unlike the difluoroacrylate monomer generated from the trifluorocarboxylate ester (1), have less fluorine atoms introduced in the carboxylate moiety, and are more prone to oxidation decomposition and form radicals. Such radicals act as a polymerization initiator to induce the polymerization of the acrylate monomer and/or the monofluoroacrylate monomer, and consequently a film is formed on the surface of alkali components. The film prevents the alkali components from causing the decomposition of the trifluorocarboxylate ester (1). As a result, initial efficiency is enhanced and reaction resistance can be lowered.

The amount of the trifluoropropionate ester (1) is not less than 10 mass % of the nonaqueous electrolyte, and is preferably not less than 20 mass %, and may be not less than 30 mass % of the nonaqueous electrolyte. When the amount of the trifluoropropionate ester (1) is in the above range, the nonaqueous electrolyte can attain high oxidation resistance. While the trifluoropropionate ester (1) is easily decomposed when the nonaqueous electrolyte is brought into contact with alkali components, the use of the fluorinated carboxylate ester (2) makes it possible to suppress the decomposition of the trifluoropropionate ester (1).

The amount of the fluorinated carboxylate ester (2) is, for example, 0.05 to 10 mass % of the nonaqueous electrolyte, preferably 0.1 to 10 mass % or 0.5 to 7 mass %, and still more preferably 1 to 6 mass %. When this amount is met, the decomposition of the trifluorocarboxylate ester (1) by alkali components is suppressed more easily while ensuring that the nonaqueous electrolyte will exhibit high oxidation resistance attributed to the trifluorocarboxylate ester (1).

In the formula (2), it is preferable that at least one of X1 and X2 be a fluorine atom (that is, a fluorine atom be at an α-position relative to the carbonyl group). In particular, ethyl 2-fluoropropionate is preferable. That is, it is preferable that the fluorinated carboxylate ester (2) include at least ethyl 2-fluoropropionate. Such compounds having α-fluorine atom are easy to synthesize by fluorination and are cost effective as compared to compounds with β-fluorine atom.

The nonaqueous electrolyte preferably further includes a fluorinated cyclic carbonate. The amount of the fluorinated cyclic carbonate is, for example, 1 to 30 mass % of the nonaqueous electrolyte, preferably 2 to 25 mass %, and still more preferably 5 to 20 mass %. In general, nonaqueous electrolytes containing large amounts of fluorinated nonaqueous solvents and additives tend to have high viscosity and low ion conductivity. When the fluorinated cyclic carbonate having high dielectric constant is used in the present embodiment, the dissociation of carrier ions is promoted and the nonaqueous electrolyte attains enhanced ion conductivity. Further, the addition of the fluorinated cyclic carbonate results in the formation of an appropriate film on the negative electrode surface and thus prevents an excessive increase in resistance.

The nonaqueous electrolyte may further include a fluoroalkyl carboxylate ester represented by the following formula (3) (hereinafter, also written as the fluoroalkyl carboxylate ester (3)):

[Chem. 5]

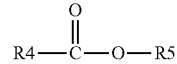

(3)

In the formula, R4 is a $C_{1-3}$ alkyl group and R5 is a fluorinated $C_{1-3}$ alkyl group. The amount of the fluoroalkyl carboxylate ester is, for example, 1 to 60 mass % of the nonaqueous electrolyte, preferably 10 to 50 mass %, and still more preferably 15 to 45 mass %. By the use of the fluoroalkyl carboxylate ester (3), the viscosity of the electrolytic solution is reduced and the pourability of the solution may be improved.

Further, the fluoroalkyl carboxylate ester (3) is effective for enhancing the film-forming ability of the fluorinated carboxylate ester (2) and thus makes it possible to further suppress the decomposition of the trifluorocarboxylate ester (1). Although details are not clear, it is probable that during the formation of a film by the fluorinated carboxylate ester (2) on the surface of alkali components, part of the fluoroalkyl carboxylate ester (3) is incorporated into the film and the film becomes a complex film. This complex film will be highly durable because the fluoroalkyl carboxylate ester (3) does not have fluorine in R4 and does not release HF under the action of alkalis. Consequently, the high durability performance ascribed to the trifluorocarboxylate ester (1) can be brought out while ensuring that initial efficiency and reaction resistance are improved.

The nonaqueous electrolyte preferably further includes propylene carbonate (PC). In this case, the ion conductivity of the nonaqueous electrolyte can be further enhanced. In particular, when the nonaqueous electrolyte includes a combination of PC and a fluorinated cyclic carbonate, high ion conductivity can be maintained even after the amount of the fluorinated cyclic carbonate is lowered by repeated charging and discharging.

In the nonaqueous electrolyte according to the present embodiment, the trifluoropropionate ester (1) is mainly classified as a nonaqueous solvent, and the fluorinated carboxylate ester (2) as an additive. However, the manner of classification is not particularly limited to the above case.

Hereinbelow, the nonaqueous electrolyte will be described in more detail.

(Lithium Salts)

The nonaqueous electrolyte includes a lithium salt as a solute. Examples of the lithium salts which may be used include lithium hexafluorophosphate ($LiPF_6$), lithium perchlorate ($LiClO_4$), lithium tetrafluoroborate ($LiBF_4$), $LiAlCl_4$, $LiSbF_6$, LiSCN, $LiCF_3SO_3$, $LiCF_3CO_2$, $LiAsF_6$, $LiN(CF_3SO_2)_2$, $LiB_{10}Cl_{10}$, lithium lower aliphatic carboxylates, LiCl, LiBr, LiI, lithium tetrachloroborate, lithium tetraphenylborate and lithium imide salts. The lithium salts may be used singly, or two or more may be used in combination. The concentration of the lithium salt in the nonaqueous electrolyte is not particularly limited, but is preferably 0.2 to 2 mol/L, and more preferably 0.5 to 1.5 mol/L.

(Nonaqueous Solvents)

The nonaqueous electrolyte includes a trifluoropropionate ester (1) as an essential component. High oxidation resistance is obtained by using the trifluoropropionate ester (1). Examples of the $C_{1-3}$ alkyl groups represented by R1 in the formula (1) include methyl group, ethyl group, n-propyl group and i-propyl group. Of these, methyl group or ethyl group is preferable. The nonaqueous electrolyte may include a single kind of the trifluoropropionate ester (1), or two or more kinds of the trifluoropropionate esters (1).

In particular, FMP having a methyl group as R1 is low in viscosity and high in oxidation resistance. It is therefore preferable that the trifluoropropionate ester (1) that is used include at least FMP. The proportion of FMP in the trifluoropropionate esters (1) is, for example, not less than 50 mass %, and preferably not less than 80 mass %. The trifluoropropionate ester (1) may be exclusively FMP.

The nonaqueous electrolyte may further include a fluoroalkyl carboxylate ester (3). The fluoroalkyl carboxylate ester (3) is classified as a nonaqueous solvent, but the manner of classification is not particularly limited to this case.

In the fluoroalkyl carboxylate ester (3), examples of the $C_{1-3}$ alkyl groups represented by R4, and those of the $C_{1-3}$ alkyl moieties of the fluorinated $C_{1-3}$ alkyl groups represented by R5 include those groups mentioned with respect to R1. The number of fluorine atoms in R5 may be selected in accordance with the number of carbon atoms in the $C_{1-3}$ alkyl group, and is preferably 1 to 5, and more preferably 1 to 3. R4 is preferably a methyl group or an ethyl group, and is preferably a methyl group to attain a low viscosity. Some preferred examples of R5 are trifluoromethyl group and 2,2,2-trifluoroethyl group. In particular, 2,2,2-trifluoroethyl group which may be derived from easily available 2,2,2-trifluoroethanol is preferable.

Of the fluoroalkyl carboxylate esters (3), 2,2,2-trifluoroethyl acetate (FEA) is preferable. It is therefore preferable that the fluoroalkyl carboxylate ester (3) that is used include at least FEA.

The nonaqueous electrolyte may include a fluorine-containing nonaqueous solvent other than the trifluoropropionate esters (1) and the fluoroalkyl carboxylate esters (3). Examples of such fluorine-containing nonaqueous solvents include fluorinated cyclic carbonates. Examples of the fluorinated cyclic carbonates include fluoroethylene carbonate (FEC) and fluoropropylene carbonate. The amount of such fluorine-containing nonaqueous solvents in the nonaqueous electrolyte may be selected from, for example, 1 to 30 mass %, and may be 5 to 20 mass %.

The nonaqueous electrolyte may further include an additional fluorine-free nonaqueous solvent. Examples of the fluorine-free nonaqueous solvents include cyclic carbonates, chain carbonates, chain esters and lactones. These additional nonaqueous solvents may be used singly, or two or more may be used in combination. In particular, cyclic carbonates are preferable because high ion conductivity can be obtained. PC is particularly preferable because of its low solidification point. The amount of such additional nonaqueous solvents in the nonaqueous electrolyte may be selected from, for example, 1 to 30 mass %, and may be 2 to 20 mass %.

(Additives)

The nonaqueous electrolyte includes a fluorinated carboxylate ester (2) as an essential component. Examples of the $C_{1-3}$ alkyl groups and those of the $C_{1-3}$ alkyl moieties of the fluorinated $C_{1-3}$ alkyl groups represented by R2 and R3 in the formula (2) include those groups mentioned with respect to R1. In the fluorinated $C_{1-3}$ alkyl group, the number of fluorine atoms may be determined appropriately in accordance with the number of carbon atoms in the alkyl group, and is preferably 1 to 5, and may be 1 to 3. Examples of the fluorinated $C_{1-3}$ alkyl groups include fluoromethyl group, fluoroethyl group, difluoromethyl group, trifluoromethyl group and 2,2,2-trifluoroethyl group.

R2 is preferably a hydrogen atom or a $C_{1-3}$ alkyl group, and is particularly preferably a hydrogen atom. R3 is preferably a $C_{1-3}$ alkyl group.

In the formula (2), one or two or X1 to X4 are fluorine atoms. When one of X1 to X4 is a fluorine atom, the fluorine atom may be located at an α-position (for example, X1) or a β-position (for example, X3) relative to the carbonyl group in the formula (2). When two of X1 to X4 are fluorine atoms, the fluorine atoms may be located at α-positions (X1 and X2), at β-positions (X3 and X4), or at an α-position and a β-position (for example, X1 and X3) relative to the carbonyl group in the formula (2).

Examples of the fluorinated carboxylate esters (2) include ethyl 2-fluoropropionate (αF-EP), ethyl 3-fluoropropionate, ethyl 2,2-difluoropropionate, ethyl 2,3-difluoropropionate and ethyl 3,3-difluoropropionate. Of these, fluorinated carboxylate esters having an α-fluorine atom are preferable.

To improve charge discharge characteristics of batteries, the nonaqueous electrolyte may contain an additive other than the fluorinated carboxylate esters (2). Examples of such additives include vinylene carbonate (VC), vinyl ethylene carbonate, cyclohexylbenzene (CHB) and fluorobenzene. The amount of such additives in the nonaqueous electrolyte is, for example, 0.01 to 15 mass %, and may be 0.05 to 10 mass %.

[Nonaqueous Electrolyte Secondary Batteries]

The nonaqueous electrolyte described above is used in secondary batteries. A nonaqueous electrolyte secondary battery of the present invention includes the above nonaqueous electrolyte and further includes a positive electrode, a negative electrode, and a separator disposed between the positive electrode and the negative electrode.

FIG. 1 is a vertical sectional view schematically illustrating the structure of a nonaqueous electrolyte secondary battery according to an embodiment of the present invention. The nonaqueous electrolyte secondary battery includes a bottomed cylindrical battery case 4 serving also as a negative electrode terminal, an electrode assembly accommodated in the battery case 4, and an alkaline electrolytic solution that is not shown. In the electrode assembly, a negative electrode 1, a positive electrode 2 and a separator 3 disposed between the electrodes are wound into a coil. At the opening of the battery case 4, a sealing plate 7 including a positive electrode terminal 5 and a safety valve 6 is arranged via an insulating gasket 8, and the open end of the battery case 4 is crimped inwardly so as to seal the inside of the nonaqueous electrolyte secondary battery. The sealing plate 7 is electrically connected to the positive electrode 2 via a positive electrode current collector 9.

Such a nonaqueous electrolyte secondary battery may be obtained by placing the electrode assembly into the battery case 4, pouring the nonaqueous electrolyte, arranging the sealing plate 7 into the open end of the battery case 4 via the insulating gasket 8, and crimping the open end of the battery case 4 so as to form a seal. In this process, the outermost periphery of the negative electrode 1 of the electrode assembly is placed into contact with the battery case 4 and is thereby electrically connected thereto. The positive electrode 2 of the electrode assembly, and the sealing plate 7 are electrically connected via the positive electrode current collector 9.

Hereinbelow, the constituents of the nonaqueous electrolyte secondary batteries other than the nonaqueous electrolyte will be described in detail.

(Positive Electrodes)

The positive electrode includes a positive electrode active material such as a lithium transition metal compound. The positive electrode usually includes a positive electrode current collector, and a positive electrode active material layer attached on a surface of the positive electrode current collector.

Examples of the positive electrode current collectors include metal foils, and porous substrates such as punched sheets and expanded metals. Some example materials of the positive electrode current collectors are stainless steel, titanium, aluminum and aluminum alloys.

The positive electrode active material layer may be formed on one side or both sides of the positive electrode current collector. The positive electrode active material layer includes a positive electrode active material and a binder. The positive electrode active material layer may further contain additives such as a thickener and a conductive agent as required.

Examples of the transition metal elements contained in the lithium transition metal compounds include Co, Ni and Mn. Part of the transition metal may be replaced by a dissimilar element. The dissimilar element may be at least one selected from, for example, Na, Mg, Sc, Y, Cu, Fe, Zn, Al, Cr, Pb, Sb and B. The positive electrode active materials may be used singly, or two or more may be used in combination.

Specific examples of the positive electrode active materials include $Li_xNi_yM_zMe_{1-(y+z)}O_{2+d}$, $Li_xM_yMe_{1-y}O_{2+d}$ and $Li_xMn_2O_4$. M is at least one element selected from the group consisting of Co and Mn. Me is the dissimilar element described above, and is preferably at least one metal element selected from the group consisting of Al, Cr, Fe, Mg and Zn. In the above formulae, $0.98 \leq x \leq 1.2$, $0.3 \leq y \leq 1$, and $0 \leq z \leq 0.7$, with the proviso that $0.9 \leq (y+z) \leq 1$, and $-0.01 \leq d \leq 0.01$.

In particular, a lithium transition metal compound which contains nickel is significantly swollen and shrunk during charging and discharging, and secondary particles thereof tend to be broken and expose alkali components. Even in the case where such a compound is used, the initial efficiency can be enhanced and the reaction resistance can be reduced by the use of the nonaqueous electrolyte described hereinabove. Such effects can be attained even when the proportion of nickel is as high as, for example, 50 mol % or more (in the above formula, $0.5 \leq y$) of the transition metal content in the compound.

Examples of the binders include fluororesins such as polytetrafluoroethylene and polyvinylidene fluoride; polyolefin resins such as polyethylene and polypropylene; polyamide resins such as aramid; polyimide resins such as polyimide and polyamidimide; and rubbery materials such as styrene butadiene rubber and acrylic rubber. The binders may be used singly, or two or more may be used in combination. The amount of the binder is, for example, 0.1 to 10 parts by mass per 100 parts by mass of the positive electrode active material.

Examples of the conductive agents include carbon blacks, graphites, carbon fibers and carbon fluorides. The conductive agents may be used singly, or two or more may be used in combination. The amount of the conductive agent is, for example, 0.1 to 10 parts by mass per 100 parts by mass of the positive electrode active material.

Examples of the thickeners include cellulose derivatives such as carboxymethylcellulose (CMC) and Na salt of CMC, poly $C_{2-4}$ alkylene glycols such as polyethylene glycol and ethylene oxide-propylene oxide copolymer, polyvinyl alcohols and soluble modified rubbers. The thickeners may be used singly, or two or more may be used in combination.

The amount of the thickener is not particularly limited and is, for example, 0.01 to 10 parts by mass per 100 parts by mass of the positive electrode active material.

The positive electrode may be formed by preparing a positive electrode slurry including the positive electrode active material and the binder, and applying the slurry onto a surface of the positive electrode current collector. The positive electrode slurry may be prepared using a conventional device such as a mixer or a kneader. The positive electrode slurry may be applied to the surface of the positive electrode current collector by a conventional application method. The film of the positive electrode slurry formed on the surface of the positive electrode current collector is usually dried and compressed in the thickness direction.

The positive electrode slurry usually includes a dispersion medium. Where necessary, a conductive agent and a thickener may be further added. Examples of the dispersion media include, but are not limited to, water, alcohols such as ethanol, ethers such as tetrahydrofuran, amides such as dimethylformamide, N-methyl-2-pyrrolidone (NMP), and mixtures of these solvents.

(Negative Electrodes)

The negative electrode includes a negative electrode current collector, and a negative electrode active material layer attached to the negative electrode current collector. Examples of the negative electrode current collectors include those described for the positive electrode current collectors. Examples of the materials of the negative electrode current collectors include stainless steel, nickel, copper, copper alloys, aluminum and aluminum alloys.

The negative electrode active material layer includes a negative electrode active material as an essential component, and may include a binder, a conductive agent and/or a thickener as optional components. The negative electrode active material layer may be disposed on one side or both sides of the negative electrode current collector.

The negative electrode may be a deposited film formed by a gas phase method, or may be a mixture layer including the negative electrode active material, a binder, and optionally a conductive agent and/or a thickener.

The deposited film may be formed by depositing the negative electrode active material onto the surface of the negative electrode current collector by a gas phase method such as vacuum deposition. In this case, the negative electrode active material may be, for example, silicon, a silicon compound or a lithium alloy which will be described later.

Where the negative electrode includes a negative electrode mixture layer, such a negative electrode may be prepared in accordance with the method for fabricating the positive electrode. The components other than the active material may be similar to those in the positive electrode. The amounts of such components per 100 parts by mass of the negative electrode active material may be selected from the ranges of amounts per 100 parts by mass of the positive electrode active material described with respect to the positive electrode. The amount of the conductive agent is, for example, 0.01 to 5 parts by mass per 100 parts by mass of the negative electrode active material. The amount of the thickener is, for example, 0.01 to 10 parts by mass per 100 parts by mass of the negative electrode active material.

Examples of the negative electrode active materials include carbon materials, silicon, silicon compounds such as silicon oxides, and lithium alloys containing at least one selected from tin, aluminum, zinc and magnesium. Examples of the carbon materials include graphites (for example, natural graphite and artificial graphite) and amorphous carbons.

(Separators)

Examples of the separators include porous membranes (porous films) and nonwoven fabrics including resins. Examples of the resins which form the separators include polyolefin resins such as polyethylene, polypropylene and ethylene-propylene copolymer. The porous films may contain inorganic particles as required.

The thickness of the separator is, for example, 5 to 100 μm.

(Others)

The shapes of the nonaqueous electrolyte secondary batteries are not particularly limited and may be, among others, cylindrical shapes, flat shapes, coin shapes and prismatic shapes.

The nonaqueous electrolyte secondary battery may be manufactured by a conventional method selected in accordance with factors such as the shape of the battery. The cylindrical or prismatic battery may be produced by, for example, winding the positive electrode, the negative electrode and the separator for separating the positive and negative electrodes into an electrode assembly, and placing the electrode assembly and the nonaqueous electrolyte into a battery case.

The electrode assembly is not limited to a wound coil, and may be a laminate or a continuously folded structure. Depending on the shape of the battery or the battery case, the electrode assembly may have a cylindrical shape or a flat shape with an oval end face perpendicular to the winding axis.

The battery case may be a laminate film or may be made of a metal. Examples of the metals as materials for the battery cases include aluminum, aluminum alloys (alloys containing trace amounts of metals such as manganese and copper) and steel sheets.

EXAMPLES

Hereinbelow, the present invention will be described in detail based on EXAMPLES and COMPARATIVE EXAMPLES. However, it should be construed that the scope of the present invention is not limited to such EXAMPLES.

Example 1

A nonaqueous electrolyte secondary battery was fabricated in the following manner.

(1) Fabrication of Positive Electrode

A positive electrode active material, acetylene black (a conductive agent) and polyvinylidene fluoride (a binder) were mixed together in a mass ratio of 100:1:0.9. An appropriate amount of NMP was added. A positive electrode mixture slurry was thus prepared. The positive electrode active material used was lithium transition metal oxide represented by $LiNi_{0.82}Co_{0.15}Al_{0.03}O_2$ (NCA).

The positive electrode mixture slurry was applied to both sides of an aluminum foil (a positive electrode current collector). The films were dried and compressed with a roller. Consequently, a positive electrode was fabricated which had positive electrode active material layers on both sides of the positive electrode current collector. The active material density in the positive electrode was 3.7 $g/cm^3$.

(2) Fabrication of Negative Electrode

Artificial graphite (a negative electrode active material), CMC Na salt as a thickener and styrene butadiene rubber (SBR) as a binder were mixed together in aqueous solution in a mass ratio of 100:1:1 to give a negative electrode mixture slurry. The negative electrode mixture slurry was applied to both sides of a copper foil (a negative electrode current collector). The films were dried and compressed with a roller. Consequently, a negative electrode was fabricated which had negative electrode mixture layers on both sides of the negative electrode current collector. The active material density in the negative electrode was 1.7 $g/cm^3$.

(3) Preparation of Nonaqueous Electrolyte

Lithium hexafluorophosphate ($LiPF_6$) was dissolved with 1.2 M concentration into a mixed solvent which included FEC, PC and FMP in a volume ratio of 20:2:78. VC and αF-EP as additives were added to the solution. A nonaqueous electrolyte was thus prepared. The amounts of the additives were 1 mass % for VC and 1 mass % for αF-EP relative to the total mass of the nonaqueous electrolyte. The amounts of FEC, PC and FMP relative to the total mass of the nonaqueous electrolyte were 19.8 mass %, 1.6 mass % and 66.0 mass %, respectively.

(4) Fabrication of Nonaqueous Electrolyte Secondary Battery

The positive electrode and the negative electrode obtained above were wound via a separator therebetween to form a wound electrode assembly. The separator was a polyethylene microporous membrane. The electrode assembly was placed into an exterior can, which was then filled with the nonaqueous electrolyte. Next, the opening of the exterior can was tightly closed with a sealing plate via a gasket. An 18650 cylindrical nonaqueous electrolyte secondary battery having a design capacity of 3250 mAh was thus fabricated. In the above process, the positive electrode was welded to the sealing plate via a positive electrode lead, and the negative electrode was welded to the bottom of the exterior can via a negative electrode lead.

(5) Evaluation

The battery fabricated above was tested by the following procedures to measure the initial efficiency and the reaction resistance.

(a) Initial Efficiency

The battery was charged at a constant current of 0.2 It (650 mA) until the voltage reached 4.2 V and was further charged at a constant voltage of 4.2 V until the current value reached 0.02 It (65 mA). After a rest of 20 minutes, the battery was discharged at a constant current of 0.2 It (650 mA) to a voltage of 3.0 V. The temperature during the charging and discharging was 25° C. The initial charging and discharging efficiency was obtained using the following equation:

Initial charging and discharging efficiency (%)=(Initial discharge capacity/Initial charge capacity)×100

(b) Reaction Resistance

The battery was charged and discharged repeatedly two times under the same charging and discharging conditions as in (a) above. Next, the battery was charged at a constant current of 0.2 It (650 mA) until the voltage reached 3.7 V and was further charged at a constant voltage of 3.7 V until the current value reached 0.02 It (65 mA). Thereafter, the AC impedance was measured in a thermostatic chamber at 25° C. In the measurement of AC impedance, the amplitude was 10 mV and the frequency was changed from 1 MHz to 30 MHz. From the Nyquist plots obtained, the resistance values of arc components were read, and the reaction resistance was determined. The reaction resistances obtained in EXAMPLES and COMPARATIVE EXAMPLES described later are shown in percentages (%) normalized with the reaction resistance in COMPARATIVE EXAMPLE 1 taken as 100.

(c) Cycle Characteristics

The battery was charged and discharged repeatedly fifty times under the same charging and discharging conditions as in (a) above. The capacity retention ratio after the 50 cycles was determined from the following equation.

Capacity retention ratio (%)=(Discharge capacity after 50 cycles/Initial discharge capacity)×100

Example 2

A nonaqueous electrolyte secondary battery was fabricated and evaluated in the same manner as in EXAMPLE 1, except that the amount in which αF-EP was added was controlled so that the proportion of αF-EP to the total mass of the nonaqueous electrolyte would be 6 mass %.

Comparative Example 1

A nonaqueous electrolyte secondary battery was fabricated and evaluated in the same manner as in EXAMPLE 1, except that αF-EP was not added in the preparation of the nonaqueous electrolyte.

Example 3

A nonaqueous electrolyte secondary battery was fabricated and evaluated in the same manner as in EXAMPLE 1, except that the mixed solvent used in the preparation of the nonaqueous electrolyte was replaced by one which had been prepared by mixing FEC, PC, FMP and FEA in a volume ratio of 20:2:40:38. The amounts of FEC, PC, FMP and FEA relative to the total mass of the nonaqueous electrolyte were 19.9 mass %, 1.6 mass %, 34.0 mass % and 31.8 mass %, respectively.

Example 4

A nonaqueous electrolyte secondary battery was fabricated and evaluated in the same manner as in EXAMPLE 3, except that the amount in which αF-EP was added was controlled so that the proportion of αF-EP to the total mass of the nonaqueous electrolyte would be 6 mass %.

Comparative Example 2

A nonaqueous electrolyte secondary battery was fabricated and evaluated in the same manner as in EXAMPLE 3, except that αF-EP was not added in the preparation of the nonaqueous electrolyte.

Comparative Example 3

A nonaqueous electrolyte secondary battery was fabricated and evaluated in the same manner as in EXAMPLE 1, except that the mixed solvent used in the preparation of the nonaqueous electrolyte was replaced by one which had been prepared by mixing FEC, PC and EMC (ethyl methyl carbonate) in a volume ratio of 20:2:78.

Comparative Example 4

A nonaqueous electrolyte secondary battery was fabricated and evaluated in the same manner as in COMPARATIVE EXAMPLE 3, except that the amount in which αF-EP was added was controlled so that the proportion of αF-EP to the total mass of the nonaqueous electrolyte would be 6 mass %.

Comparative Example 5

A nonaqueous electrolyte secondary battery was fabricated and evaluated in the same manner as in COMPARATIVE EXAMPLE 3, except that αF-EP was not added in the preparation of the nonaqueous electrolyte.

The results of EXAMPLES and COMPARATIVE EXAMPLES are described in Table 1. EXAMPLES 1 to 4 are shown as A1 to A4, and COMPARATIVE EXAMPLES 1 to 5 as B1 to B5.

TABLE 1

| | Nonaqueous solvents (volume ratio) | Additives (mass %) | | Initial efficiency (%) | Reaction resistance (%) | Capacity retention ratio (%) |
|---|---|---|---|---|---|---|
| A1 | FEC/PC/FMP | VC (1%) | αF-EP (1%) | 88.0 | 91 | 95 |
| A2 | (20/2/78) | VC (1%) | αF-EP (6%) | 88.8 | 88 | 96 |
| B1 | | VC (1%) | — | 87.2 | 100 | 95 |
| A3 | FEC/PC/FMP/FEA | VC (1%) | αF-EP (1%) | 88.4 | 84 | 97 |
| A4 | (20/2/40/38) | VC (1%) | αF-EP (6%) | 89.6 | 79 | 97 |
| B2 | | VC (1%) | — | 87.0 | 96 | 95 |
| B3 | FEC/PC/EMC | VC (1%) | αF-EP (1%) | 88.9 | 89 | 92 |
| B4 | (20/2/78) | VC (1%) | αF-EP (6%) | 88.6 | 89 | 91 |
| B5 | | VC (1%) | — | 89.1 | 88 | 92 |

As shown in Table 1, EXAMPLES achieved enhanced initial efficiency and significantly low reaction resistance as compared to the corresponding COMPARATIVE EXAMPLES. No improvements in initial efficiency and reaction resistance are seen when αF-EP is added to an electrolytic solution which does not contain FMP.

INDUSTRIAL APPLICABILITY

The nonaqueous electrolytes according to the present invention offer high initial efficiency and make it possible to reduce the reaction resistance. Thus, the nonaqueous electrolytes are useful for secondary batteries used in electronic devices such as cellular phones, personal computers, digital still cameras, game machines and portable audio devices.

REFERENCE SIGNS LIST

1 NEGATIVE ELECTRODE
2 POSITIVE ELECTRODE
3 SEPARATOR
4 BATTERY CASE
5 POSITIVE ELECTRODE TERMINAL
6 SAFETY VALVE
7 SEALING PLATE
8 INSULATING GASKET
9 POSITIVE ELECTRODE CURRENT COLLECTOR

The invention claimed is:

1. A nonaqueous electrolyte for secondary batteries comprising:
a lithium salt,
a trifluoropropionate ester represented by the following formula (1):

[Chem. 1]

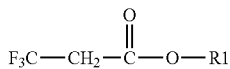
(1)

wherein R1 is a $C_{1-3}$ alkyl group, and
a fluorinated carboxylate ester represented by the following formula (2):

[Chem. 2]

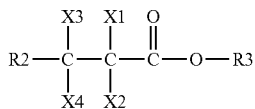
(2)

wherein X1, X2, X3 and X4 are each a hydrogen atom or a fluorine atom, one or two of X1 to X4 are fluorine atoms, R2 is a hydrogen atom, a $C_{1-3}$ alkyl group or a fluorinated $C_{1-3}$ alkyl group, and R3 is a $C_{1-3}$ alkyl group or a fluorinated $C_{1-3}$ alkyl group,
the amount of the trifluoropropionate ester being not less than 10 mass % of the nonaqueous electrolyte.

2. The nonaqueous electrolyte according to claim 1, wherein the amount of the fluorinated carboxylate ester is 0.05 to 10 mass % of the nonaqueous electrolyte.

3. The nonaqueous electrolyte according to claim 1, wherein the amount of the trifluoropropionate ester is not less than 30 mass % of the nonaqueous electrolyte.

4. The nonaqueous electrolyte according to claim 1, wherein at least one of X1 and X2 in the formula (2) is a fluorine atom.

5. The nonaqueous electrolyte according to claim 1, wherein the fluorinated carboxylate ester comprises ethyl 2-fluoropropionate.

6. The nonaqueous electrolyte according to claim 1, wherein the nonaqueous electrolyte further comprises a fluorinated cyclic carbonate, and
the amount of the fluorinated cyclic carbonate is 5 to 20 mass % of the nonaqueous electrolyte.

7. The nonaqueous electrolyte according to claim 1, wherein the nonaqueous electrolyte further comprises a fluoroalkyl carboxylate ester represented by the following formula (3):

[Chem. 3]

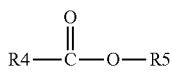
(3)

wherein R4 is a $C_{1-3}$ alkyl group and R5 is a fluorinated $C_{1-3}$ alkyl group, and
the amount of the fluoroalkyl carboxylate ester is 15 to 45 mass % of the nonaqueous electrolyte.

8. The nonaqueous electrolyte according to claim 7, wherein the fluoroalkyl carboxylate ester comprises 2,2,2-trifluoroethyl acetate.

9. The nonaqueous electrolyte according to claim 1, wherein the nonaqueous electrolyte further comprises propylene carbonate.

10. A nonaqueous electrolyte secondary battery comprising a positive electrode, a negative electrode, a separator disposed between the positive electrode and the negative electrode, and the nonaqueous electrolyte described in claim 1.

11. The nonaqueous electrolyte secondary battery according to claim 10, wherein the positive electrode comprises a positive electrode active material,
the positive electrode active material comprises a lithium transition metal compound which contains nickel, and
the proportion of nickel is 50 mol % or more of the transition metal content in the transition metal compound.

* * * * *